United States Patent Office 3,269,843
Patented August 30, 1966

3,269,843
**FOOD COMPOSITIONS CONTAINING UNDE-
NATURED WATER-SOLUBLE LACTALBU-
MIN PHOSPHATES**
Jean I. McKee, Homewood, and James W. Tucker, Floss-
moor, Ill., assignors to Stauffer Chemical Company,
New York, N.Y., a corporation of Delaware
No Drawing. Filed Oct. 30, 1963, Ser. No. 319,978
11 Claims. (Cl. 99—94)

This invention relates to improved food compositions comprising undenatured lactalbumin phosphates and a method of producing the same. In a preferred aspect, the invention is directed to baking compositions and comminuted meat products in which undenatured lactalbumin phosphate is substituted in whole or in part for the usual non-fat dry milk ingredients.

The precipitation of soluble proteins, such as albumin, with certain condensed phosphates has long been known. This action occurs only in acid media and has been the subject of considerable study, see, e.g., B. Katchman et al., Biochim. et Biophys. A.C.T.A., 14, 445 (1954). Although there is some evidence that this precipitation may involve chemical reaction, it is presently throught to be mainly one of cation-anion interaction. At pH values below their isoelectric point, proteins act as high molecular weight cationic electrolytes, the overall charge of which depends on the exact pH. The higher the molecular weight of the given water-soluble protein, the less of a given phosphate is needed to give a precipitate, and, conversely, the higher the molecular weight of the phosphate, the less of a given protein is needed (Katchman et al., ibid.). It is also known that the soluble protein in milk, contained in the milk whey, may be precipitated with long chain phosphates after removal of colloidally dispersed solids (casein). About one-fourth of all of the proteins contained in milk are solubilized in the whey. The casein may be precipitated from milk by acidification to pH 4.6, by salt precipitation, or by the action of rennet.

The lactalbumin phosphate contained in the improved food compositions of the instant invention has the major proportion of its protein moiety in substantially undenatured water-soluble form. In this regard, it is important to note that a common problem in milk processing is denaturation of the protein. Heat denaturation is most common. The principal results of heat denaturation on whey proteins are a decreased solubility of the proteins in both acid and salt solutions and an increased activity of sulfhydryl groups, see, Jenness, R., Effects of Heat Treatment on Serum Proteins, J. Agr. Food, 75, 1954. Whey proteins are presently thought to be a mixture of $\alpha$-lactalbumin, $\beta$-lactoglobulin, and $\gamma$-globulin, Advances in Food Research, vol. 10, 1960, pp. 45–49. The effect of heat on $\beta$-lactoglobulin is perhaps most pronounced. Changes in whey protein, caused by heat denaturation, have limited its utility in food applications heretofore. The lactalbumin phosphate of the present invention, which contains its protein in an undenatured form, is not so limited and is useful in many applications where denatured protein is unsuitable.

We have now discovered that undenatured lactalbumin phosphates may be advantageously used in food applications, especially as a substitute for non-fat dry milk solids (hereinafter alternatively NFDM). Unexpectedly, the lactalbumin phosphate will perform the same function as NFDM in some instances at only a fraction of the amount of NFDM normally required for the same function, while producing superior over-all characteristics, even at such reduced proportions. As a constituent in white cakes, for instance, lactalbumin phosphates may be used at only one-half the normal formula proportion of NFDM to yield a final baked product palpably superior to cakes baked from a NFDM-containing formulation. In some applications, equal replacement of NFDM is desirable, e.g., comminuted meats, but at such levels improved products often result.

Undenatured lactalbumin phosphate has been found to be particularly suitable as a replacement, or partial replacement, for NFDM in the following specific food applications:

Prepared cake mixes
    Biscuit mixes
    Self-rising flour
    Comminuted meats
    Pizza dough
    Refrigerated canned biscuits
    Pancake mixes
    Bread
    Cookie mixes In addition to the above, undenatured lactalbumin phosphates have also been found suitable for use in doughnut mixes, whipping agents, frozen biscuit doughs, chemically leavened yeast products, pie crust mixes, commercial cake baking, and breading and batter mixes.

The proportion of lactalbumin phosphate suitable for any of the aforesaid applications will vary widely depending upon the specific application and desired result. For baking compositions where the lactalbumin phosphate is used as a replacement for NFDM, e.g., prepared cake mixes, biscuit mixes, cookie mixes, etc., the usual proportion is less than about 5.0%, and preferably between 1.0% and 3.0%, by weight of the blended composition. As a partial replacement for NFDM, as little as 0.1% lactalbumin phosphate may be beneficial. Maximum enhancement of the properties of comminuted meats is achieved where the lactalbumin phosphate comprises between 1.0% and 3.0% by weight of the meat composition.

The lactalbumin phosphate of the instant application may be succinctly defined as the product produced by "reacting" long chain polyphosphates with liquid whey and drying the resulting precipitate without denaturation of the protein. Suitable long chain polyphosphates are the glassy sodium and potassium metaphosphates of the formulas $(NaPO_3)_x$ and $(KPO_3)_x$, respectively, having an average chain length (represented by $x$) of at least 30. These straight chain inorganic polymers, which are sometimes known as hexametaphosphates, are to be distinguished from the cyclic or ring metaphosphates. Where potassium metaphosphate is used, it is preferable to first react the metaphosphate in solution with a sodium salt such as sodium sulfate, sodium chloride, sodium pyrophosphate, sodium hexametaphosphate (short chain) etc., to improve solubility. Mixtures of sodium and potassium glassy metaphosphates are also suitable for precipitating lactalbumin phosphate. The preparation of undenatured protein metaphosphates by reaction between an alkali metal metaphosphate and soluble protein is described in an article by Briggs, David R., The Journal of Biological Chemistry, vol. 134, June 1940, pp. 261–272. After treatment of the whey protein with a glassy metaphosphate by the preferred process of the present invention, the whey is centrifuged to collect a heavy, gumlike coagulum of lactalbumin phosphate which is then dried. To prevent denaturation of the protein, the whey temperature is normally maintained below 180° F., preferably below about 160° F. For the same reason, it is preferable to dry the coagulum by spray-drying at low temperatures, although other types of driers, such as drum driers, rotary driers, etc., are also suitable. Recovery of the soluble proteins from the whey is essentially quantative, with only minor processing losses. The following specific example will further illustrate the preparation of undenatured lactalbumin phosphate.

Example 1

To 1400 pounds of bovine whey at 140–180° F. is added 80 pounds of a 10% solution of eight parts sodium metaphosphate and one part potassium metaphosphate. The treated whey is then passed into a De Laval-type centrifuge where a heavy, gum-like coagulum is recovered. The coagulum is then spray-dried and recovered as a white particulate product.

In general, the characteristics and properties of the lactalbumin phosphate produced according to the aforesaid procedure will be somewhat dependent upon processing conditions (temperature, etc.), the pH of the whey, and the chain length of the glassy metaphosphate starting material. As normally produced, the product contains between 40% and 70% protein and between about 15% and 25% phosphate. A preferred lactalbumin phosphate for food applications contains between about 50 and 65% protein. Also, the lactalbumin phosphate will range in pH from about 5 to 7, while a preferred product has a pH of about 6.0. We will now more specifically illustrate the application of undenatured lactalbumin phosphates in various food products.

PREPARED CAKE MIXES

One of the most advantageous utilities for lactalbumin phosphate is in the preparation of cakes. Among the main advantages are increased tolerance to variations in liquid, mixing time, eggs, and baking temperature. In addition, cakes containing lactalbumin phosphates are generally superior in quality to those prepared from formulations containing NFDM. Speaking broadly, the usual improvements noted are (1) an approximate 10% increase in cake volume, (2) more uniform grain, (3) whiter crumb color in white cakes, and (4) improved eating quality in terms of lightness. The foregoing improvements result at one-half to two-thirds the usual level of NFDM solids, although equal or even high levels may be used without detriment, as will be illustrated hereinafter.

Example 2

The following specific samples of undenatured lactalbumin phosphate were prepared:

| Lactalbumin phosphate sample designation | Analysis, percent | | pH (10% solution) |
|---|---|---|---|
| | Protein | Phosphorus | |
| A | 67.39 | 4.9 | 6.6 |
| B | 62.08 | 6.8 | 6.3 |
| C | 60.75 | 6.5 | 6.5 |
| D | 62.62 | 6.6 | 6.6 |
| E | 54.30 | 6.2 | 5.6 |

Each of the above samples was used as a replacement for non-fat dry milk solids in a standard white cake formulation having the following composition:

STANDARD WHITE CAKE FORMULATION

| | Parts by weight |
|---|---|
| Cake flour | 39.6 |
| Salt | 1.0 |
| Soda, granular | 0.69 |
| Wheat starch | 2.0 |
| Corn sugar | 0.5 |
| SAP-Aluminum sulfate leavener [1] | 0.77 |
| Milled sugar | 43.0 |
| Lactalbumin phosphate (or NFDM) | 2.0–3.0 |
| Shortening | 9.35 |

[1] The combination leavening acid consists of approximately 93% SAP and 7% anhydrous aluminum sulfate—see U.S. Patent 3,041,177—"SAP" stands for a sodium aluminum phosphate leavening acid.

The standard procedure for baking with the above formulation comprises adding two egg whites and 1¼ cups of water to the dry ingredients; then mixing for four minutes at medium speed in a household mixer. The batter is placed in two 8″ diameter cake tins and baked at an oven temperature of 350° F. for approximately thirty to thirty-five minutes. The results of baking the standard white cake formulation containing lactalbumin phosphates (herein "LP") are presented in the following table where "NFDM" refers to a control formulation comprising non-fat dry milk which is presented for comparative purposes.

TABLE I.—STANDARD CAKE MIX BAKE TESTS OF LACTALBUMIN PHOSPHATE

| Formulation [1] (Corres. to LP sample) (Designation supra) | Batter, specific gravity | Cake | | | | |
|---|---|---|---|---|---|---|
| | | Specific volume | pH | Crust [2] character | Grain [2] | Crumb [2] color |
| A | 0.79 | 3.60 | 6.95 | 6 | 8 | 9 |
| B | 0.77 | 3.55 | 6.75 | 9 | 9 | 9 |
| C | 0.79 | 3.40 | 6.80 | 8 | 8 | 8 |
| D | 0.79 | 3.48 | 6.70 | 7 | 9 | 9 |
| E | 0.79 | 3.54 | 6.80 | 6 | 9 | 10 |
| NFDM | 0.80 | 3.34 | 7.10 | 9 | 7 | 8 |

[1] Standard Formulation—NFDM and all lactalbumin phosphates used at 3 parts by weight except sample E which was 2 parts by weight.
[2] Numerals represent baking score rated on scale of 1 to 10 with higher quality reflected by a higher score.

The principal criterion used for determining the crust character of cakes evaluated under the Standard Cake Mix Bake Test was the rim overlap of the cake. In the above table, a score of six for crust character indicates a moderate rim, while a score of nine indicates a very slight rim. Intermediate scores reflect intermediate characteristics. The baking score assigned to "grain" in the above table, was predicated mainly on the fineness and evenness of the grain with a score of seven reflecting a slightly fine and irregular grain, and a score of nine a fine, even grain. A score of ten in the above table for crumb color would indicate a pure white crumb, while a score of eight or below would indicate a slightly creamy cast to the crumb.

Example 3

The lactalbumin phosphate samples of Example 2 were tested in a standard cake mix tolerance test to determine what effect the substitution of lactalbumin phosphate for NFDM would have upon baking tolerance. The superior tolerance of the formulations containing lactalbumin phosphates is illustrated by the data of the following table:

TABLE II.—EVALUATION OF LACTALBUMIN PHOSPHATES AND NFDM IN CAKE TOLERANCE
[Tests]

| Formulation [1] (LP sample designation of Example 2) | Batter, specific gravity | Cake | | | | |
|---|---|---|---|---|---|---|
| | | Specific volume | pH | Crust [2] character | Grain [2] | Crumb [2] color |
| STANDARD BAKE | | | | | | |
| B | 0.79 | 3.50 | 6.70 | 9 | 8 | 9 |
| E | 0.78 | 3.66 | 6.80 | 6 | 9 | 10 |
| NFDM | 0.80 | 3.34 | 7.10 | 9 | 7 | 8 |
| TWO MINUTE MIXING | | | | | | |
| B | 0.82 | 3.47 | | 8 | 8 | 9 |
| E | 0.84 | 3.42 | | 8 | 9 | 9 |
| NFDM | 0.85 | 3.15 | | 6 | 6 | 7 |

TABLE II—Continued

HIGH TEMPERATURE BAKING (385° F.)

| | | | | | | |
|---|---|---|---|---|---|---|
| B | 0.77 | 3.50 | ------ | 7 | 8 | 9 |
| E | 0.74 | 3.42 | ------ | 7 | 9 | 10 |
| NFDM | 0.80 | 3.10 | ------ | 4 | 5 | 7 |

REDUCED WATER (10% LESS)

| | | | | | | |
|---|---|---|---|---|---|---|
| B | 0.79 | 3.66 | 6.80 | 7 | 10 | 10 |
| E | 0.78 | 3.65 | 6.90 | 7 | 10 | 10 |
| NFDM | 0.81 | 3.43 | 7.20 | 7 | 6 | 7 |

EXCESS WATER (10% MORE)

| | | | | | | |
|---|---|---|---|---|---|---|
| B | 0.86 | 3.30 | ------ | 7 | 9 | 9 |
| E | 0.83 | 3.23 | ------ | 7 | 9 | 10 |
| NFDM | 0.87 | 3.08 | ------ | 7 | 7 | 6 |

[1] Same as Table I, supra. [2] Same as Table I, supra.

From the data of Table II, it may be observed that the formulations containing lactalbumin phosphate have more tolerance to variations in baking and preparation. The specific volumes of cakes containing the lactalbumin phosphates were found to be consistently higher than the formulations containing NFDM, this being true even for Sample E which was used at a level of only two parts by weight of the total formulation (compared to three parts by weight for NFDM).

The improved tolerance to high temperature baking of lactalbumin phosphate is especially desirable in view of the commonly known difficulty of maintaining accurate temperatures in the average household oven. Also, the inherent difficulty of making accurate measurements of ingredients when working with the small proportion required for household baking, makes tolerance an important characteristic of a prepared cake mix.

*Example 4*

The effect of using wheys from different sources for preparing lactalbumin phosphates, as well as changes in protein, phosphorus content and pH of the precipitated product, upon performance in white cake mixes was studied. The following specifically identified undenatured lactalbumin phosphate samples were prepared for such study:

| Lactalbumin phosphate sample designation | Source of whey | Analysis, percent | | pH (10% soln.) |
|---|---|---|---|---|
| | | Protein | Phosphorus | |
| F | Cheddar cheese | 62 | 4.30 | 6.35 |
| G | Cottage cheese | 50 | 9.35 | 6.00 |
| H | Cheddar cheese | 50 | 3.87 | 6.50 |
| I | Lactic casein | 50 | 6.14 | 6.25 |
| J | Cheddar cheese | 50 | 4.96 | 6.50 |

The foregoing lactalbumin phosphate samples were used with the standard white cake mix formulation of Example 2 in the preparation of cakes. A cake prepared from a formulation containing 3% by weight of NFDM is included for comparison purposes. The results of baking with the above lactalbumin phosphate samples are presented in Table III.

TABLE III.—STANDARD CAKE MIX BAKE OF LACTALBUMIN PHOSPHATES PREPARED FROM DIFFERENT WHEYS

| Formulation [1] (corres. to LP sample) (designation supra) | Batter, specific gravity | Cake | | | | |
|---|---|---|---|---|---|---|
| | | Specific volume | pH | Crust [2] character | Grain [2] | Crumb [2] color |
| F | 0.74 | 3.65 | 7.07 | Mod. rim, v. even. | Sl. irrreg. mod. fine. | V. sl. creamy. |
| G | 0.73 | 3.57 | 6.59 | Mod. rim, even. | Mod. even, mod. fine. | White. |
| H | 0.75 | 3.53 | 7.18 | Large rim, v. even. | Mod. fine, sl. even. | Sl. creamy. |
| I | 0.73 | 3.53 | 6.96 | Mod. rim, even. | Sl. open, mod. even, fine. | White. |
| J | 0.74 | 3.53 | 7.09 | Mod. rim, even. | Sl. open, mod. even, fine. | White. |
| NFDM | 0.73 | 3.39 | 7.31 | Mod. rim, even. | Sl. open, sl. irreg., sl. fine. | Sl. creamy. |

[1] Standard formulation—all lactalbumin phosphates employed a 2 parts by weight level and NFDM at 3 parts by weight.
[2] Mod.=moderate; v.=very; sl.=slightly; irreg.=irregular.

The data of the foregoing table indicate that lactalbumin phosphates prepared from different wheys do not differ appreciably in their performance characteristics in cakes. For example, no significant difference between cake specific volume, crust character, grain, or crumb color can be observed between cakes prepared from Samples F and G shown above, although the former was prepared from a Cheddar cheese whey and had a pH of 6.35, while the latter was prepared from a cottage cheese whey and had a pH of 6.0. The lactalbumin phosphate prepared from lactic casein, Sample I in the table, also performs similarly to lactalbumin phosphates prepared from Cheddar and cottage cheese wheys. Once again, all of the lactalbumin phosphates outperformed NFDM, although used at a lower use level. It is significant that Samples F and H, which had the lowest phosphorus content of the various samples tested, produce quite satisfactory baking results.

*Example 5*

To determine more specifically what influence pH of the lactalbumin phosphate has upon performance in cakes, the following undenatured lactalbumin phosphate samples were prepared:

| Lactalbumin phosphate sample designation | Percent Protein | Percent Phosphorus | pH (10% solution) |
|---|---|---|---|
| K | 60.37 | 5.95 | 5.15 |
| L | | | 5.60 |
| M | | | 5.95 |
| N | 58.19 | 6.20 | 6.60 |
| O | 67.54 | 0.62 | 7.30 |

Samples K through N above were prepared from the same bovine whey and contained approximately the same protein and phosphorus content, although ranging in pH values from 5.15 to 6.60. Sample O, which had a pH of 7.30, was a low phosphorus-high protein composition.

The baking response of a standard cake mix formulation containing each of the above samples was determined. The cake formulation and baking procedure used were those described, supra, in Example 2. For comparison purposes, one cake was baked with lactalbumin phosphate Sample E, from Example 2, and another with NFDM. Each of the cakes was evaluated to determine the effect of LP pH, water tolerance, and use level of lactalbumin phosphate. The results are presented in Table IV.

TABLE IV.—EFFECT OF LP pH, WATER TOLERANCE, AND USE LEVEL OF LACTALBUMIN PHOSPHATES

| Formulation [1] (corres. to LP sample designation) | Batter, specific gravity | Cake | | | | |
|---|---|---|---|---|---|---|
| | | Specific volume | pH | Crust [2] character | Grain [2] | Crumb [2] color |
| STANDARD BAKE (LP pH EFFECT) | | | | | | |
| K | 0.72 | 3.58 | 7.22 | 7 | 8 | 9 |
| L | 0.74 | 3.42 | 7.31 | 10 | 9 | 9 |
| M | 0.71 | 3.51 | 7.40 | 10 | 9 | 9 |
| N | 0.71 | 3.61 | 7.43 | 8 | 9 | 8 |
| O | 0.71 | 3.54 | 7.80 | 7 | 8 | 5 |
| E | 0.73 | 3.58 | 7.20 | 6 | 9 | 10 |
| NFDM | 0.71 | 3.27 | 7.41 | 8 | 7 | 8 |
| WATER TOLERANCE (10% EXCESS H$_2$O) | | | | | | |
| K | 0.77 | 3.07 | | 8 | 8 | 9 |
| L | 0.76 | 3.08 | | 8 | 8 | 9 |
| M | 0.75 | 3.18 | | 9 | 8 | 9 |
| N | 0.78 | 3.25 | | 9 | 9 | 8 |
| O | 0.77 | 3.19 | | 9 | 10 | 5 |
| E | 0.78 | 3.20 | | 7 | 9 | 9 |
| NFDM | 0.78 | 2.96 | | 7 | 7 | 8 |
| VARIATION OF USE LEVEL (APPROX. 2-5% OF FORMULATION | | | | | | |
| M (approx. 2%) | 0.75 | 3.58 | 7.28 | 10 | 9 | white. |
| E (approx. 2%) | 0.71 | 3.57 | 7.20 | 7 | 9 | Do. |
| M (approx. 3%) | 0.74 | 3.56 | 7.19 | 10 | 9 | Do. |
| E (approx. 3%) | 0.71 | 3.63 | 7.10 | 7 | 10 | Do. |
| M (approx. 4%) | 0.74 | 3.56 | 7.00 | 9 | 9 | Do. |
| E (approx. 4%) | 0.70 | 3.56 | 6.91 | 6 | 9 | Do. |
| M (approx. 5%) | 0.73 | 3.64 | 6.90 | 9 | 8 | Do. |
| E (approx. 5%) | 0.70 | 3.54 | 6.80 | 5 | 9 | Do. |

[1] Except where specified otherwise, lactalbumin phosphates used at 2% level and NFDM used at 3% level.
[2] Same as Table I, supra.

The data presented in the above table show that LP Sample M produced the best baking response, as indicated by the high specific volumes and baking score. It should be noted that Sample M had a pH of 5.95 and produced a cake pH of 7.40, the latter corresponding closely to the pH of a cake containing NFDM. Sample O, which was a low phosphorus sample, produced a high specific volume and good crust and grain scores, although it yielded a cake with very poor crumb color (for a white cake mix—not necessarily detrimental with other cakes). Samples K through N all proved superior to NFDM in baking response and water tolerance. In the water tolerance test, Sample O proved to be superior to NFDM, although once again, it yielded a cake with a very dark crumb. At use levels of 3% and 2%, both Samples M and E performed quite satisfactorily.

BISCUIT MIXES

Lactalbumin phosphates may be used at equal or ¾ replacement level of NFDM. At such levels, lactalbumin phosphates yield biscuits having specific volumes approximately 10–20% greater than biscuits prepared from NFDM. Other advantages include a marked improvement in eating quality in terms of tenderness and lightness and increased shelf life caused by the LP maintaining baking response at a significantly higher level.

SELF-RISING FLOUR

Lactalbumin phosphates furnish the same advantages in self-rising flours as in biscuit mixes. Further, the baking performance of poor quality self-rising flours may be improved significantly by pre-blending 1 to 2% by weight of lactalbumin phosphate in the dry flour. Performance is about equivalent in soft and hard wheat flours, bleached or unbleached.

COMMINUTED MEATS

Various additives such as NFDM, alkali metal pyro- and polyphosphates, and ascorbic acid are commonly known to be useful in comminuted meats. For example, ascorbic acid brightens cured meat color by a reducing action on the pigment myoglobulin, while NFDM produces a binding effect. The following experiment was conducted to explore the possible replacement of these known additives, in whole or in part, with lactalbumin phosphates.

*Example 6*

Sausage emulsions containing lactalbumin phosphates (or NFDM) and the following ingredients in the indicated proportions were prepared:

Lard _____grams__ 26.2
Salt with added sodium nitrite _____grams__ 2.0
Water _____ml.__ 12.8
Lean ground beef _____grams__ 59.0

The ingredients were chopped while held in a chilled metal bowl using an Omni-mixer. Five seconds' initial chopping at a setting of 130 volts was followed by scraping and then ten seconds final chopping. Where lactalbumin phosphate or NFDM were used as additives, they replaced an equivalent weight of ground beef in the above sausage formulation. To determine the percentage cook loss and cured color of the cooked meat, 100 gram samples of the sausage were subjected to steam bath temperatures for nine minutes.

Two different lactalbumin phosphate samples, one prepared from a sweet whey (Cheddar cheese whey) and one from an acid whey (cottage cheese whey), were evaluated as additives to comminuted meat. The non-fat dry milk contained undenatured protein, and was produced at low heat. Each meat sample containing the lactalbumin phosphate was found to have either moderate or low cook loss, good color, and good or superior knit, while most of the samples containing no additives or phosphate and/or NFDM additives were, with few exceptions, inferior in each of these categories. Lactalbumin phosphate tended to lower the pH which might, in part, explain its effect upon color. No dfference in performance was observed between lactalbumin phosphate prepared from acidic or sweet wheys. In some instances, low heat NFDM produced improved color like the lactalbumin phosphate. This may be caused by the undenatured whey protein present in such milk. The above results were found at a 2% level of lactalbumin phosphate and NFDM. At a 1% level, NFDM had no detrimental effect on cook loss, but failed to perform as well as lactalbumin phosphate in regards to color and knit. The specific effects of alkali metal phosphates, NFDM, and lactalbumin phosphate on sausage emulsions are presented in the following table wherein the term "control" refers to a meat sample free of any additives.

grain uniformity of the bread are improved significantly with lactalbumin phosphates.

COOKIE MIXES

Example 7

To test the properties of lactalbumin phosphates in cookie mixes, a standard bakery refrigerated cookie TABLE V.—EFFECTS OF ALKALI METAL PHOSPHATES, NFDM, AND LACTALBUMIN PHOSPHATES ON SAUSAGE EMULSIONS

| Sausage (additive and percent used in sausage emulsion) | Sausage pH Raw | Sausage pH Cooked | Cook loss, percent by weight | Color [1] (visual) | Knit (visual) |
|---|---|---|---|---|---|
| Control | 5.9 | 6.1 | 12.5 | gray | |
| 2.0% LP (sweet whey) | 5.9 | 5.6 | 3.4 | sl. pink | |
| 2.0% LP (acid whey) | 5.8 | 5.7 | 4.1 | sl. pink | |
| 2.0% low heat NFDM | 6.0 | 5.8 | 9.4 | gray | |
| 0.25% TSPP [2] | 6.2 | 6.4 | 2.5 | gray | |
| 0.25% TSPP+2% LP (sweet whey) | 6.2 | 6.2 | 1.6 | v. sl. pink | |
| 0.25% TSPP+2% LP (acid whey) | 6.2 | 6.1 | 1.7 | v. sl. pink | |
| 0.25% TSPP+2% NFDM | 6.3 | 6.2 | 5.8 | gray | |
| Control | 6.1 | 6.3 | 3.9 | v. sl. pink | Mod. |
| 2.0% LP (sweet whey) | 6.0 | 6.0 | 2.2 | sl. pink | good. |
| 0.9% (NaPO₃)ₓ | 6.2 | 6.3 | 2.5 | tr. pink | good. |
| 2.0% NFDM | 6.1 | 6.2 | 5.0 | gray | mod. |
| 0.25% TSPP [2] | 6.5 | 6.6 | 2.0 | gray | mod. |
| 0.25% TSPP+2% LP (sweet whey) | 6.4 | 6.3 | 1.3 | tr. pink | good. |
| 0.25% TSPP+0.9% (NaPO₃)ₓ | 6.5 | 6.5 | 2.0 | gray | good. |
| 0.25% TSPP+2% NFDM | 6.4 | 6.5 | 2.8 | tr. pink | mod. |
| 0.37% STPP [2] | 6.3 | 6.3 | 1.5 | gray | mod. |
| 0.37% STPP+2% LP (sweet whey) | 6.2 | 6.3 | 1.7 | tr. pink | good. |
| 0.37% STPP+0.9% (NaPO₃)ₓ | 6.4 | 6.5 | 1.9 | gray | good. |
| 0.37% STPP+2% NFDM | 6.4 | 6.4 | 1.2 | gray | good. |
| 0.25% TSPP [2] | 6.4 | 6.5 | 2.1 | sl. pink | sl. well knit. |
| 1.0% LP (sweet whey) | 6.3 | 6.4 | 2.9 | pink | well knit. |
| 1.0% low heat NFDM | 6.4 | 6.5 | 1.3 | sl. pink | mod. well knit. |

[1] The color advantage of lactalbumin phosphate sausage products persists after exposure of cut surfaces for twenty minutes and one hour (for meaning of abbreviations see Table III, supra).
[2] TSPP means tetrasodium pyrophosphate ($Na_4P_2O_7$) and STPP means sodium tripolyphosphate ($Na_5P_3O_{10}$)

The above results indicate that the lactalbumin phosphate has both a reducing function and a binding function when incorporated in comminuted meats. Apparently sodium hexametaphosphate, when used alone, does not exhibit the reducing function, although it does appear to improve binding action in the meat.

PIZZA DOUGH

Lactalbumin phosphates improve workability and extensibility of chemically leavened pizza doughs. This prevents tearing of doughs when flattening out.

REFRIGERATED CANNED BISCUITS

When used in combination with an oxidizing agent, lactelbumin phosphates maintain good dough stability in refrigerated canned biscuits. Further, upon baking the canned biscuits containing lactalbumin phosphates increased specific volume and improved eating quality, in terms of tenderness and lightness, have been noted.

PANCAKE MIXES

Lactalbumin phosphates have been found to perform essentially the same as NFDM at equivalent levels in prepared pancake mixes.

BREAD

Direct replacement of NFDM with lactalbumin phosphate in bread dough results in a soft dough and, upon baking, furnishes bread of objectionably low volume. Small amounts of oxidizing agents may be used in combination with the lactalbumin phosphates to firm the dough and improve bread volume. Crumb color and formula was selected. The formula contained the following ingredients in about the indicated percentages:

|   | Percent |
|---|---|
| Vegetable shortening (non-emulsified) | 24.0 |
| Light brown sugar | 24.0 |
| Soda, granular | 0.53 |
| Salt | 0.53 |
| Whole egg (fresh) | 7.5 |
| Unbleached soft wheat flour | 38.0 |
| Black walnuts | 4.84 |
| Lactalbumin phosphate | 0.5–2.0 |
| Vanilla | To taste |

The vegetable shortening, sugar, soda, salt, and lactalbumin phosphate were placed in a bowl and creamed to produce a light blend on low speed of a Hobart mixer. The egg was then added slowly and mixing continued. Finally, the flour, black walnuts, lacalbumin phosphate, and vanilla were added and the dough was mixed until smooth. The dough was then formed into rolls, refrigerated overnight, sliced, and baked at 380° F. for approximately ten minutes. To evaluate the effectiveness of the lactalbumin phosphate, a control sample was prepared containing no lactalbumin phosphate. Three different storage conditions were maintained for the finished cookies:

A. Covered, room temperature
B. Uncovered, room temperature
C. Uncovered, humidity cabinet (90° F., 75% relative humidity)

The cookies were evaluated after cooling and again on the following day. In general, the cookies containing the lactalbumin phosphate were more tender and crisp initially. After holding overnight, differences in eating quality were more exaggerated, with the reference cookies being dried out, hardened, and only slightly tender. The cookies containing the lactalbumin phosphates were as tender and crisp as they had been initially and "broke" well. Even at the 0.5% lactalbumin phosphate level, the cookies produced were superior in eating quality over control samples. At a 1.0% lactalbumin phosphate level, the cookies were even more tender and crisp than at the 0.5% level, although further improvement was not noted at 1.5% and 2.0% levels of lactalbumin phosphate. At forty-eight hours, cookies from each storage condition were evaluated. Those containing the 1.5% level of lactalbumin phosphates appeared to be preferable. Cookies stored for one week showed the same trend as the forty-eight hour evaluation, while the control sample had become stale. Lactalbumin phosphate was also tested in a plain sugar cookie and a prepared brownie mix. In both cases the lactalbumin phosphate product was more tender and moist than the reference containing NFDM.

Many variations and modifications are within the scope and spirit of this invention and, therefore, no unnecessary limitations should be understood from the above patent.

We claim:

1. A food composition selected from the group consisting of comminuted meats and flour-containing mixes comprising as an active ingredient an undenatured water-soluble lactalbumin phosphate.

2. A baking composition comprising flour, sugar, shortening and an effective amount of an undenatured water-soluble lactalbumin phosphate.

3. A comminuted meat composition comprising ground meat, water and an effective amount of an undenatured water-soluble lactalbumin phosphate.

4. The comminuted meat composition of claim 3 in which the ground meat is beef.

5. A food composition selected from the group consisting of comminuted meats and flour-containing mixes comprising between 0.1% and 5.0% by weight of an undenatured, water-soluble lactalbumin phosphate.

6. A baking composition comprising flour, sugar, shortening and between 0.1% and 5.0% by weight of an undenatured, water-soluble lactalbumin phosphate.

7. A comminuted sausage composition comprising ground beef, water and between 1.0% and 3.0% by weight of an undenatured, water-soluble lactalbumin phosphate.

8. A dry, prepared cake mix comprising flour, sugar, shortening, leavening ingredients, and between 1.0% and 3.0% by weight of an undenatured, water-soluble lactalbumin phosphate.

9. A dry prepared cookie mix comprising flour, sugar, shortening, and between 0.5% and 2.0% by weight of an undenatured, water-soluble lactalbumin phosphate.

10. The method of producing an improved dry baking composition which comprises the step of admixing with the dry ingredients of said baking composition between 0.1% and 5.0% by weight of an undenatured, water-soluble lactalbumin phosphate.

11. A food composition selected from the group consisting of comminuted meats and flour-containing mixes and normally containing non-fat dry milk solids wherein at least a significant proportion of the non-fat dry milk solids is replaced with an undenatured water-soluble lactalbumin phosphate.

References Cited by the Examiner

UNITED STATES PATENTS

| | | | |
|---|---|---|---|
| 2,437,080 | 3/1948 | Daniel | 99—57 |
| 2,699,995 | 1/1955 | Hull | 99—57 |
| 3,061,442 | 10/1962 | Ward et al. | 99—91 |
| 3,189,521 | 4/1965 | Poarch | 99—109 |

OTHER REFERENCES

Briggs, "Journal of Biological Chemistry," vol. 134, June–July 1940, pp. 261–272.

A. LOUIS MONACELL, *Primary Examiner.*

RAYMOND N. JONES, *Examiner.*